United States Patent
Kim et al.

(10) Patent No.: US 7,398,452 B2
(45) Date of Patent: Jul. 8, 2008

(54) METHOD AND SYSTEM FOR DETERMINING A SIGNAL QUALITY METRIC IN EVENT OF A CRC FALSE POSITIVE

(75) Inventors: Hea Joung Kim, Irvine, CA (US); Paul Anthony Lettieri, Lake Forest, CA (US); Brima Ibrahim, Aliso Viejo, CA (US); Siukai Mak, Poway, CA (US)

(73) Assignee: Broadcom Corporation, Irvine, CA (US)

( * ) Notice: Subject to any disclaimer, the term of this patent is extended or adjusted under 35 U.S.C. 154(b) by 658 days.

(21) Appl. No.: 11/093,388

(22) Filed: Mar. 30, 2005

(65) Prior Publication Data

US 2006/0133291 A1 Jun. 22, 2006

Related U.S. Application Data

(60) Provisional application No. 60/636,712, filed on Dec. 16, 2004.

(51) Int. Cl.
*H03M 13/00* (2006.01)

(52) U.S. Cl. .................. 714/776; 714/774; 714/758; 375/340

(58) Field of Classification Search .......... 714/774, 714/776
See application file for complete search history.

(56) References Cited

U.S. PATENT DOCUMENTS

| | | | | |
|---|---|---|---|---|
| 5,237,593 A * | 8/1993 | Fisher et al. | ................. | 375/367 |
| 5,598,424 A * | 1/1997 | Erickson et al. | ............. | 714/799 |
| 5,724,368 A * | 3/1998 | Zook | ......................... | 381/71.1 |
| 6,141,784 A * | 10/2000 | Davis et al. | .................. | 714/748 |
| 6,208,699 B1 * | 3/2001 | Chen et al. | ................... | 375/340 |
| 6,356,601 B1 * | 3/2002 | Chen et al. | ................... | 375/340 |
| 6,424,632 B1 * | 7/2002 | Poret et al. | ................ | 370/395.3 |
| 6,519,738 B1 * | 2/2003 | Derby | ......................... | 714/781 |
| 6,732,321 B2 * | 5/2004 | Classon et al. | ............. | 714/774 |
| 6,754,870 B2 * | 6/2004 | Yoshida et al. | .............. | 714/758 |
| 7,082,563 B2 * | 7/2006 | Gemelli et al. | ............. | 714/758 |
| 7,251,770 B2 * | 7/2007 | Bottomley et al. | ........... | 714/755 |
| 2003/0093752 A1 * | 5/2003 | Chen | ......................... | 714/781 |
| 2004/0047327 A1 * | 3/2004 | Chen | .......................... | 370/342 |
| 2004/0137860 A1 * | 7/2004 | Oh et al. | .................. | 455/127.1 |
| 2005/0042985 A1 * | 2/2005 | Cheng et al. | ................. | 455/24 |
| 2005/0044057 A1 * | 2/2005 | Bluvshteyn et al. | ............ | 707/1 |

* cited by examiner

*Primary Examiner*—M. Mujtaba K Chaudry
(74) *Attorney, Agent, or Firm*—McAndrews, Held & Malloy, Ltd.

(57) ABSTRACT

Certain aspects of determining a signal quality metric in event of a CRC false positive may comprise measuring an amplitude and/or phase of at least a portion of a phase shift keyed section of a frame. The measured amplitude and/or phase may be checked to determine if it lies within a range of a reference amplitude and/or phase respectively. An amplitude and/or phase counter may be incremented if the measured amplitude and/or phase lies outside the range of the reference amplitude and/or phase respectively. A confidence level value of a cyclic redundancy check (CRC) for at least a portion of the phase shift keyed section of the frame may be determined based on a determined value of the incremented amplitude and/or phase counter.

30 Claims, 15 Drawing Sheets

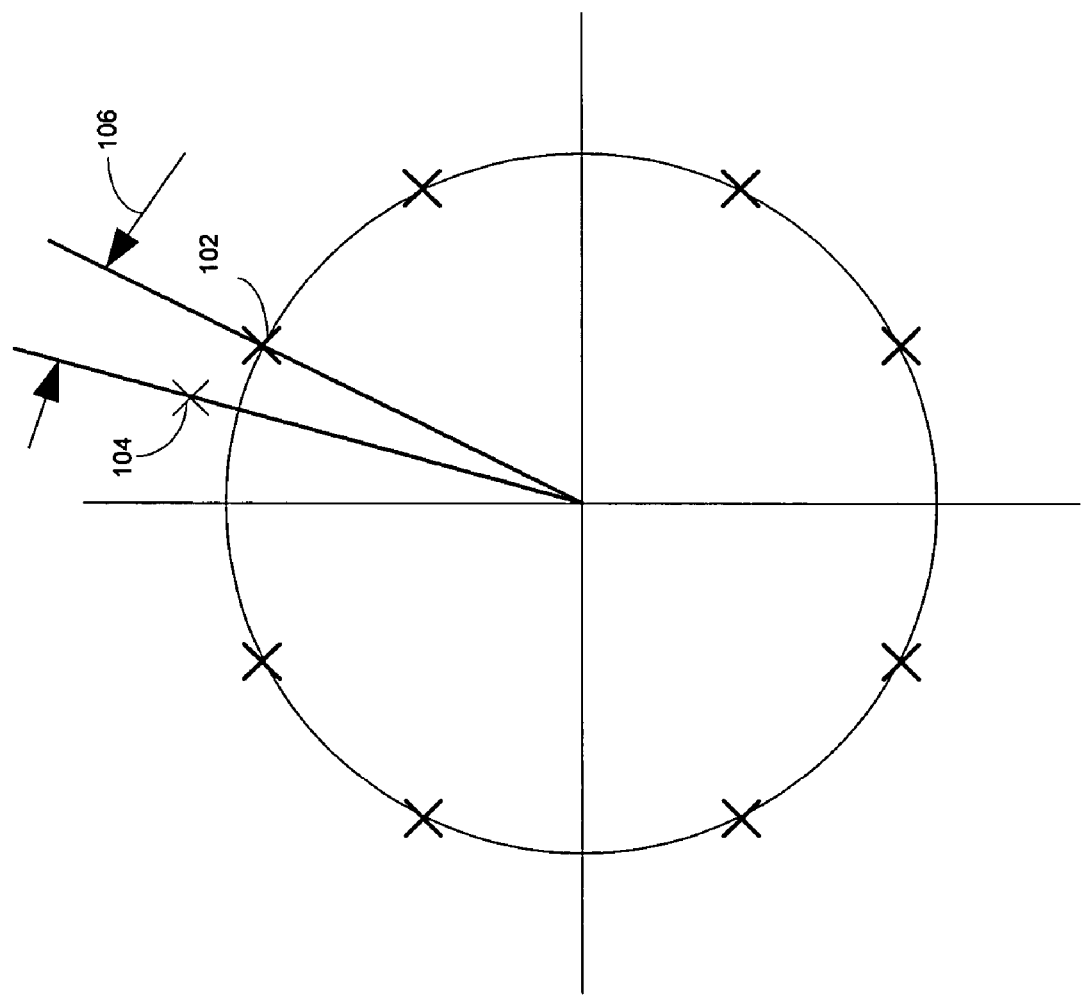

METHOD AND SYSTEM FOR DETERMINING A SIGNAL QUALITY METRIC IN EVENT OF A CRC FALSE POSITIVE

CROSS-REFERENCE TO RELATED APPLICATIONS/INCORPORATION BY REFERENCE

This patent application makes reference to, claims priority to and claims benefit from U.S. Provisional Patent Application Ser. No. 60/636,712 filed on Dec. 16, 2004.

This application also makes reference to U.S. Provisional Patent Application Ser. No. 60/634,727 filed on Dec. 8, 2004.

The above referenced applications are hereby incorporated herein by reference in their entirety.

FIELD OF THE INVENTION

Certain embodiments of the invention relate to handling signal errors. More specifically, certain embodiments of the invention relate to a method and system for determining a signal quality metric in event of a CRC false positive.

BACKGROUND OF THE INVENTION

In an ideal situation, a transmitter may transmit information over a channel or medium and the transmitted information may be received without alteration and processed by a receiver. However, a transmission medium or channel is constantly subjected to impairments such as noise and interference. Consequently, when a transmitter transmits information, a receiver may not receive the information in an identical manner in which it was transmitted. This may be due to impairments in a channel that may typically introduce errors in the transmitted information. A transmitter may code the data in such a manner that error introduced during transmission may be detected and/or corrected during reception.

Cyclic redundancy is one method, which may be utilized to code information for transmission so that at least some errors may be detected and/or corrected. A cyclic redundancy check (CRC) may be computed for a group or block of bits referred to as frames. The computed CRC may then be appended to each frame for which a CRC is computed and the frame with the CRC may be transmitted. The appended CRC may be referred to as a frame check sequence (FCS).

On the receive side, the frame check sequence may be extracted from the received information and a CRC may be computed for the received information. This calculated CRC of the received frame may then be compared with the frame check sequence and if there is a mismatch, then the received frame may be in error.

CRC utilizes very little overhead and may be easily implemented. Many conventional devices currently use cyclic redundancy check (CRC) to determine if there is an error in information that has been received from a transmitting entity. For example, a receiver may be adapted to determine a CRC on frames in a payload of a received packet. The computed CRC may be compared with a frame check sequence to determine whether the frame is in error. If the frame is determined to be in error and the error may be corrected, then the frame may be acknowledged. If the frame is in error and the error may not be corrected, then the receiver may send an indication or a signal such as a negative acknowledgement, thereby causing the packet to be retransmitted by the transmitter.

In certain instances, for example, when a very large file is transmitted and received for processing, there may be a possibility that when a CRC is computed on a corresponding received frame, the computed CRC may pass even though there may be multiple bit errors in the receive frame. This may be referred to as a false CRC pass. These types of false CRC pass indicators may be destructive in a large program or image that is being transferred.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for determining a signal quality metric in event of a CRC false positive, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1A is a diagram illustrating phase error measurement in a received phase shift keyed (PSK) packet for Bluetooth extended data rate (EDR), in accordance with an embodiment of the invention.

DETAILED DESCRIPTION OF THE INVENTION

Figure 1C:
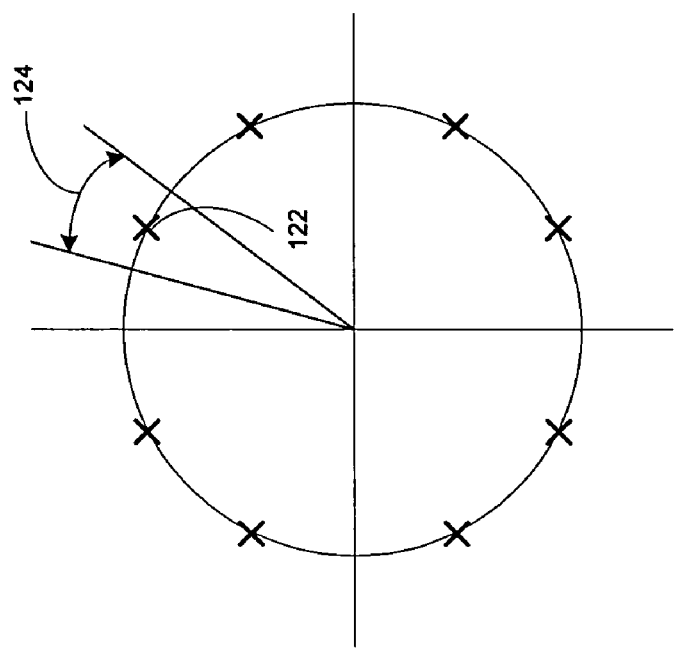
FIG. 1C is a diagram illustrating phase error measurement in a received 8-PSK packet for Bluetooth extended data rate (EDR), in accordance with an embodiment of the invention.

Certain embodiments of the invention may be found in a method and system for determining a signal quality metric in event of a CRC false positive. An embodiment of the invention provides a separate metric, which may be referred to as signal quality. A measured signal quality may be within a certain range in order to indicate a more robust CRC pass status. The signal quality may measure a magnitude delta, which may be relative to a defined reference. This magnitude delta may provide a measure of an amplitude around a unit circle to guarantee a particular signal to noise ratio (SNR). In addition to the amplitude, the signal quality may further comprise a phase component. In this regard, a measured phase component may be compared to a defined reference phase in order to further determine the quality of the signal.

In accordance with an embodiment of the invention, a payload symbol amplitude may be measured during a phase shift keying (PSK) portion of a frame. The payload symbol amplitude may be compared against the defined reference amplitude. If the payload symbol amplitude is determined to be within a specified amplitude range, then the CRC may be good. Otherwise, if the payload symbol amplitude is out of the specified amplitude range, then a counter may be incremented since the CRC may be suspect. A large count may indicate a poor signal quality in the amplitude variance during the payload period.

An embodiment of the invention may be able to detect bits in error when there is a brief burst of energy on a channel during a packet body that may not be detected by checking the CRC. The CRC may not be adapted to cover the PSK sync sequence itself. As a result, watching for bad symbols during the PSK sync sequence may not be an accurate method to determine the error.

In accordance with an embodiment of the invention, to determine magnitude error, a threshold may vary for each incoming packet. A scaled version of maximum magnitude of the decoded sync word symbols in a given packet may be utilized to determine the threshold for that packet. A varying threshold may be necessary to account for variations in the setting of an automatic gain control and may preclude checking for errors before the payload of the packet is reached.

A separate counter such as a phase counter may be utilized to count the phase error of the symbol relative to a desired reference phase. The phase error counter may be incremented whenever the phase error is larger than a specified phase threshold, which may be relative to the reference phase. In this regard, a large count may indicate a poor signal quality in the phase variance during the payload period. With the combination of the phase error counter and amplitude error counter, confidence in a passed CRC may be much higher than with the CRC alone when transmitting a very large packet.

In accordance with an embodiment of the invention, there may be absolute thresholds for phase error that may be set by registers, and each incoming symbol of a packet may be compared against the absolute threshold. An embodiment of the invention may have different thresholds for different modulation types, such as QPSK modulation and 8PSK modulation as they may have different sensitivities to phase error. In order to increase confidence in the CRC result from a received PSK packet for Bluetooth extended data rate (EDR) packets, several PSK signal quality metrics may be implemented. These metrics may consider both the magnitude and phase of each demodulated PSK symbol of the packet body, creating per-packet metrics to be considered along with the standard CRC pass/fail datum when deciding whether a packet should be kept or dropped.

FIG. 1A is a diagram illustrating phase error measurement in a received phase shift keyed (PSK) packet for Bluetooth extended data rate (EDR), in accordance with an embodiment of the invention. Referring to FIG. 1A, there is shown a sliced symbol 102, a raw symbol 104 and phase error 106. The phase error 106 may be measured as the absolute value of the amount by which the angle of a given raw symbol 104 before slicing differs from the angle of the sliced symbol 102 after slicing. The phase error deviations may be aggregated in several different ways. For example, the magnitude of phase error may be summed for all symbols in each packet. The maximum value of a weighted average of phase error magnitude for a given packet may be determined. The number of symbols in a packet whose phase error magnitude is greater than a registered threshold may be calculated.

For phase error accumulation, the phase errors of every symbol of a packet may be summed. The result may be quantized and the most significant bits of the result may be reported, even though the full resolution of the accumulation may be stored internally. The accumulation may be reset at the beginning of each packet, such that the value read at any given time may represent the accumulated error for the most recently received packet.

A running weighted average of the phase error magnitude may be calculated according to some low pass filtering, such as:

$$\text{phErrAvg} = (\alpha * \text{phErrAvg} + (1-\alpha) * \text{phErrMag})$$

where phErrAvg is the average phase error, phErrMag is the instantaneous phase error, and $\alpha$ is a factor, which determines the speed with which phErrAvg tracks phErrMag.

The final average value may not be of interest since a burst of noise in the middle of a long packet, followed by a region of moderate noise, may leave the final average value at a reasonable level even though substantial bit errors were introduced during the burst. Instead, the maximum value that this average reaches through the course of a packet, may be reported.

The total number of symbols during a packet whose phase error exceeded a certain registered threshold may be counted. The symbols falling outside of an angular range whose bounds are set by the threshold register may be counted. Each symbol may have its own bounding slice. The width of the slice may be twice the threshold, as the threshold may be compared against the absolute magnitude of the error. The measured phase error (P) of the PSK symbol may be compared with a threshold phase error ($P_{ref}$). It may be determined whether the measured phase error (P) is within a range of the threshold phase error ($P_{ref}$). If the measured phase error (P) is not within a range of the threshold phase error ($P_{ref}$), a phase counter ($C_P$) may be incremented. When the packet body is finished, it may be determined whether the value of the phase counter ($C_P$) is greater than expected. If the value of the phase counter ($C_P$) is greater than expected, the CRC may be indicated to be suspect. If the value of the phase counter ($C_P$) is not greater than expected, the CRC may be indicated to be not suspect.

Figure 1B:
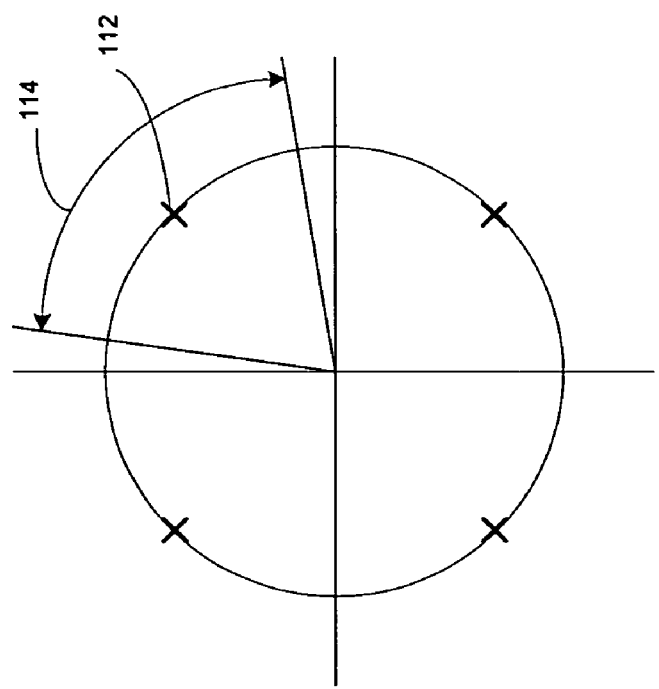
FIG. 1B is a diagram illustrating phase error measurement in a received quadrature phase shift keyed (QPSK) packet for Bluetooth extended data rate (EDR), in accordance with an embodiment of the invention.

FIG. 1B is a diagram illustrating phase error measurement in a received quadrature phase shift keyed (QPSK) packet for Bluetooth extended data rate (EDR), in accordance with an embodiment of the invention. Referring to FIG. 1B, there is shown a sliced symbol 112 and a threshold boundary for phase error 114 in a received QPSK packet for Bluetooth EDR.

FIG. 1C is a diagram illustrating phase error measurement in a received 8-PSK packet for Bluetooth extended data rate (EDR), in accordance with an embodiment of the invention. Referring to FIG. 1C, there is shown a sliced symbol 122 and a threshold boundary for phase error 124 in a received 8-PSK packet for Bluetooth EDR. Bluetooth EDR may utilize two different constellations, namely QPSK and 8-PSK, each having its own tolerance for phase error. As a result, two different threshold registers may be provided to determine phase error.

Figure 1D:
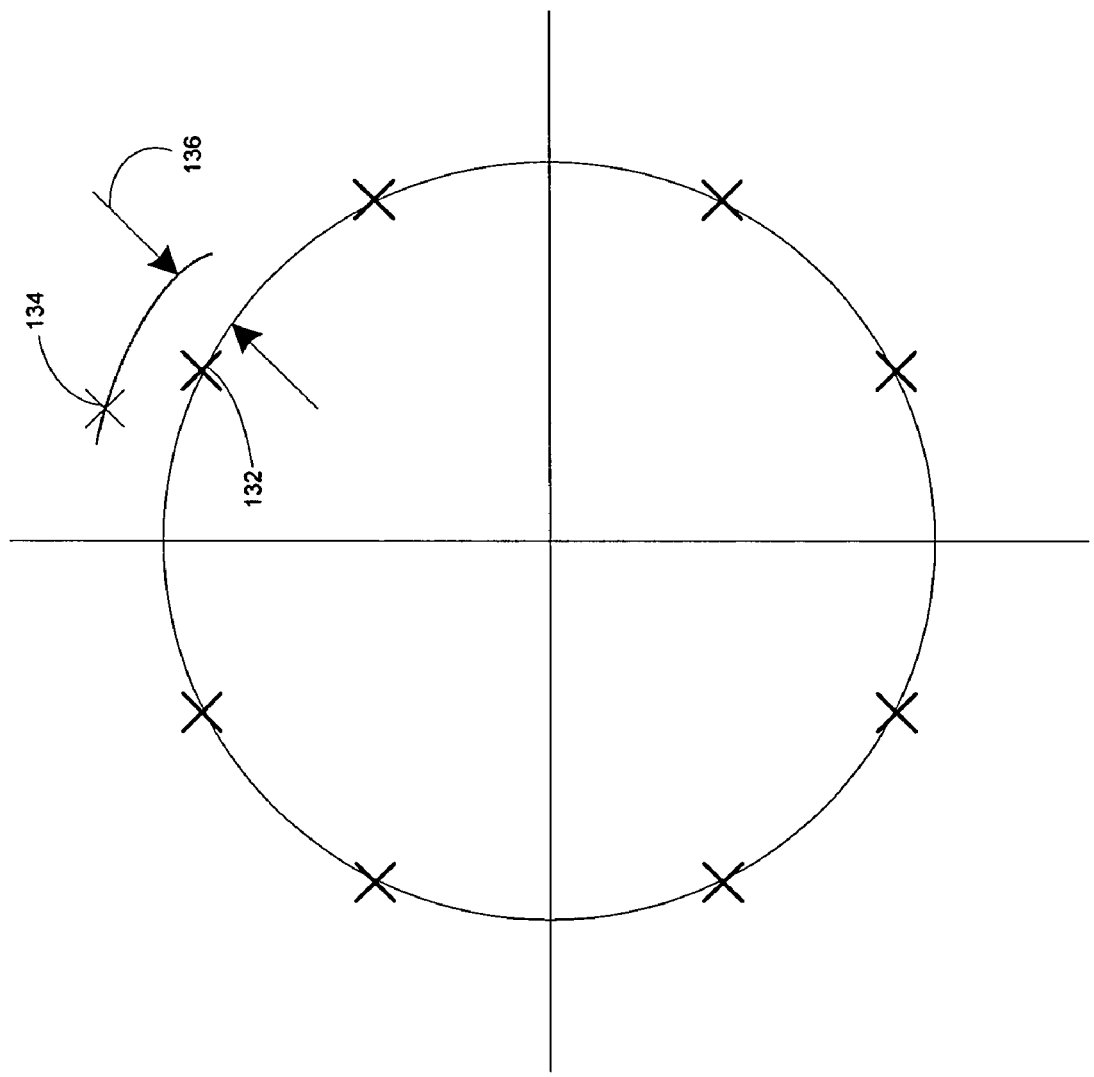
FIG. 1D is a diagram illustrating magnitude error measurement in a received phase shift keyed (PSK) packet for Bluetooth extended data rate (EDR), in accordance with an embodiment of the invention.

FIG. 1D is a diagram illustrating magnitude error measurement in a received phase shift keyed (PSK) packet for Bluetooth extended data rate (EDR), in accordance with an embodiment of the invention. Referring to FIG. 1D, there is shown a sliced symbol 132, a raw symbol 134 and a magnitude error 136. The radial distance between the sliced and raw symbols may be considered the magnitude error, and while PSK slicing is inherently sensitive to magnitude error, a large amount of magnitude error may be indicative of poor signal quality.

A PSK sync word portion of the frame may be located. The received sync word may be utilized to generate an amplitude threshold ($A_{ref}$). A packet body portion of the frame may be located. The amplitude (A) of each PSK symbol may be measured. The measured amplitude (A) of each PSK symbol may be compared with the threshold amplitude ($A_{ref}$). For each PSK symbol, it may be determined whether the measured amplitude (A) is within a range of the threshold amplitude ($A_{ref}$). For each symbol, if the measured amplitude (A) is not within a range of the threshold amplitude ($A_{ref}$), an amplitude counter ($C_A$) may be incremented. When the packet body is finished, it may be determined whether the value of the amplitude counter ($C_A$) is greater than expected. If the value of the amplitude counter ($C_A$) is greater than expected, the CRC may be indicated to be suspect. If the value of the amplitude counter ($C_A$) is not greater than expected, the CRC may be indicated to be not suspect.

Figure 1E:
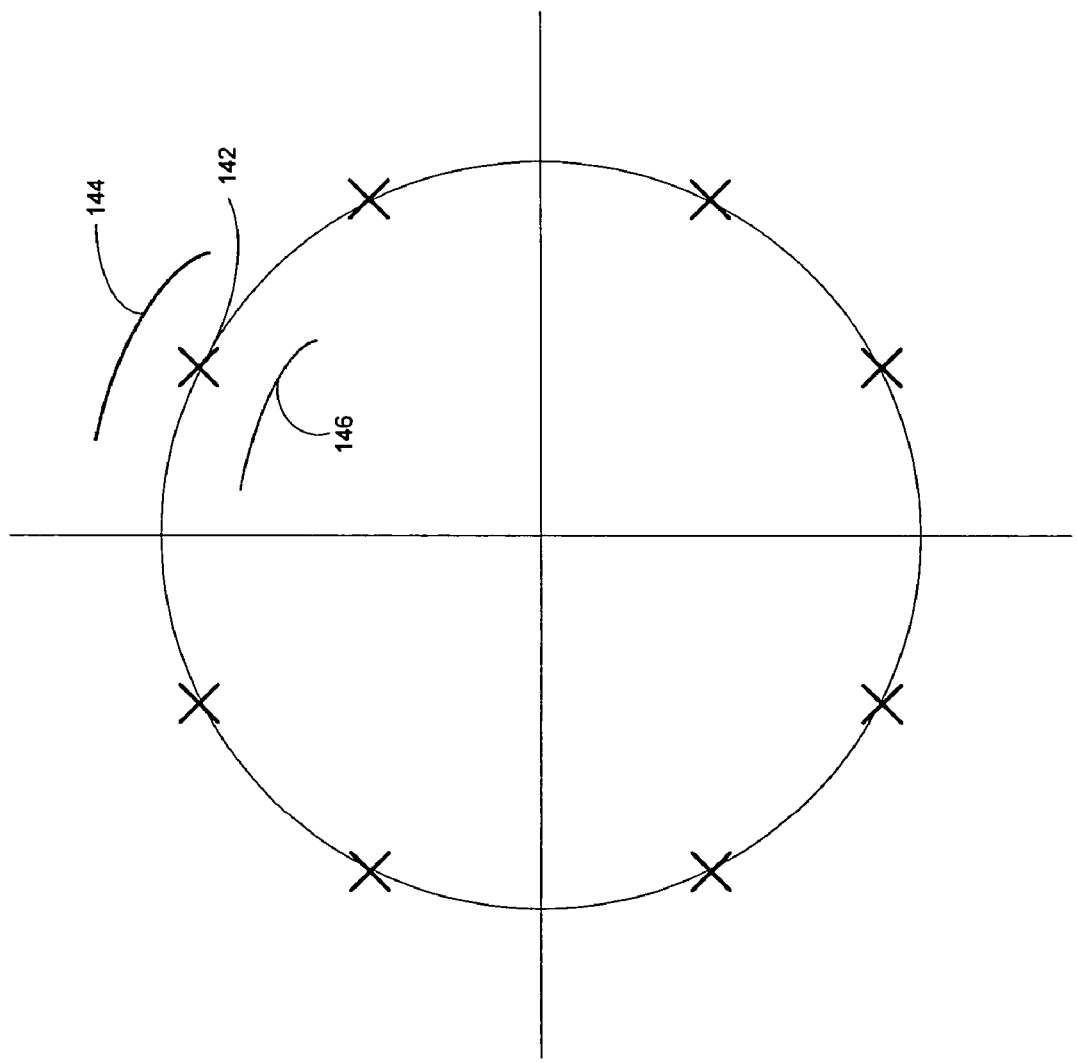
FIG. 1E is a diagram illustrating magnitude error bounding in a received phase shift keyed (PSK) packet for Bluetooth extended data rate (EDR), in accordance with an embodiment of the invention.

FIG. 1E is a diagram illustrating magnitude error bounding in a received phase shift keyed (PSK) packet for Bluetooth extended data rate (EDR), in accordance with an embodiment of the invention. Referring to FIG. 1E, there is shown a sliced symbol 142, an upper threshold boundary 144 and a lower threshold boundary 146. In the case of magnitude error, the bounds are with respect to distance from the origin.

In a receiver, automatic gain control (AGC) may be used to set the RF front end gain stages. The final setting of these gain stages combined with the magnitude of the incoming RF signal may determine the size of the demodulated symbols. The AGC may attempt to set the gain stages to produce a consistently sized signal in the demodulator. It may be difficult to set fixed thresholds, since there may be substantial magnitude variation. The EDR specification requires a PSK synchronization word to be transmitted as the first part of the PSK data for use in fine timing control, for example. As a byproduct of the PSK sync process, a receiver may produce a correlation with the expected sync word, the result of which may be a direct indicator of the expected symbol size. The correlation value may be utilized as a reference from which the magnitude thresholds, upper threshold boundary 144 and lower threshold boundary 146 may be derived. In accordance with an embodiment of the invention, additional flexibility may be incorporated to independently scale QPSK and 8-PSK upper and lower bounds by some factor.

Figure 1F:
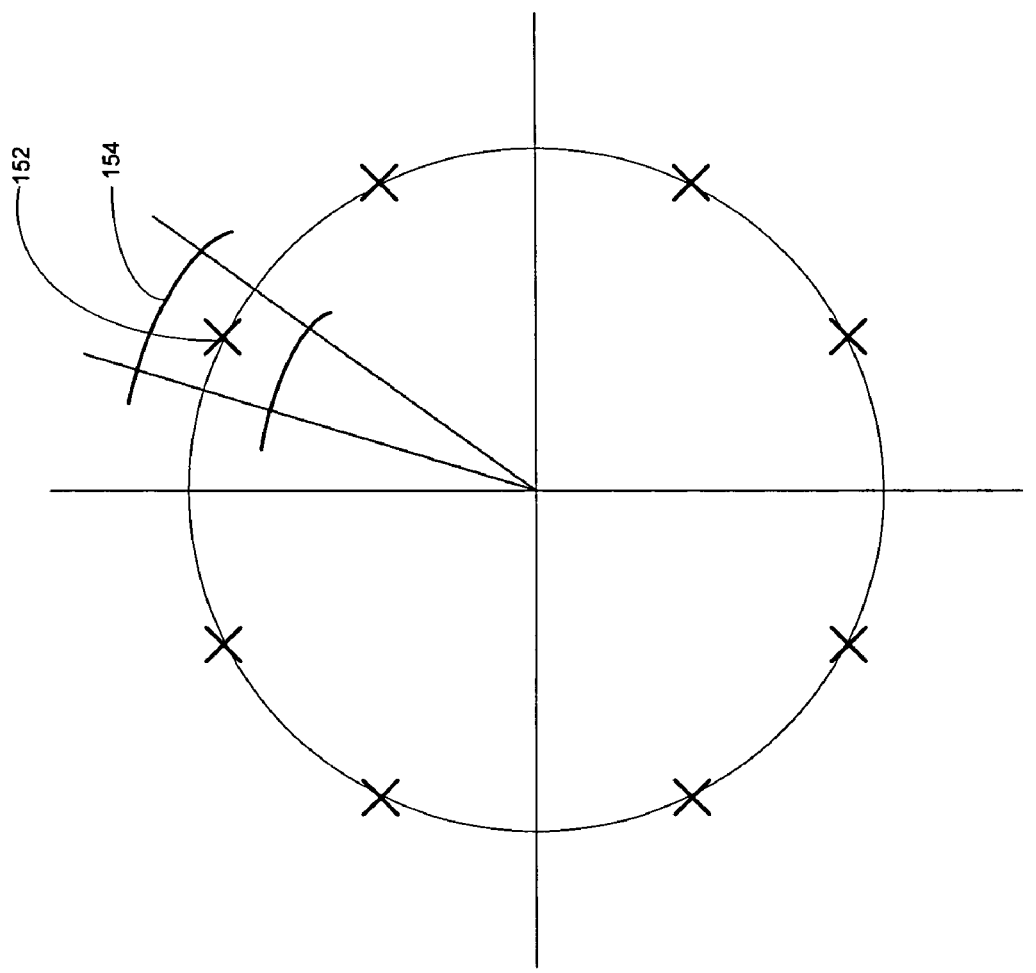
FIG. 1F is a diagram illustrating magnitude and phase error bounding in a received phase shift keyed (PSK) packet for Bluetooth extended data rate (EDR), in accordance with an embodiment of the invention.

FIG. 1F is a diagram illustrating magnitude and phase error bounding in a received phase shift keyed (PSK) packet for Bluetooth extended data rate (EDR), in accordance with an embodiment of the invention. Referring to FIG. 1F, there is shown a sliced symbol 152 and a bounding box 154. The metric "total error count" may be adapted to keep track of symbols with phase and/or magnitude out of bounds. This may not be the same as the summation of two individual metrics, as a symbol with errors in both dimensions may only count toward this new metric once. Some symbols may have only one or the other kind of failure. The metric "total error count" may be a count of symbols that may fall outside the bounding box 154.

The metric "total symbol count" may be adapted to measure how many symbols were considered for the phase and magnitude metrics. Higher layer logic, for example, firmware may be able to calculate at least an approximation of the metric "total symbol count", based on the size of the packet body. Storing the value may provide an exact count. The average phase error may be calculated as accumulated phase error divided by symbol count. Notwithstanding, other hardware-friendly techniques may be utilized to calculate the average phase error to deal with varying packet length.

It may be determined whether the accumulated amplitude and/or phase error value calculated is greater than a threshold. If the accumulated amplitude and/or phase error value calculated is greater than a threshold, the packet may be discarded. If the accumulated amplitude and/or phase error value is not greater than a threshold, the CRC may be relied upon to determine if a packet is in error.

Figure 2A:
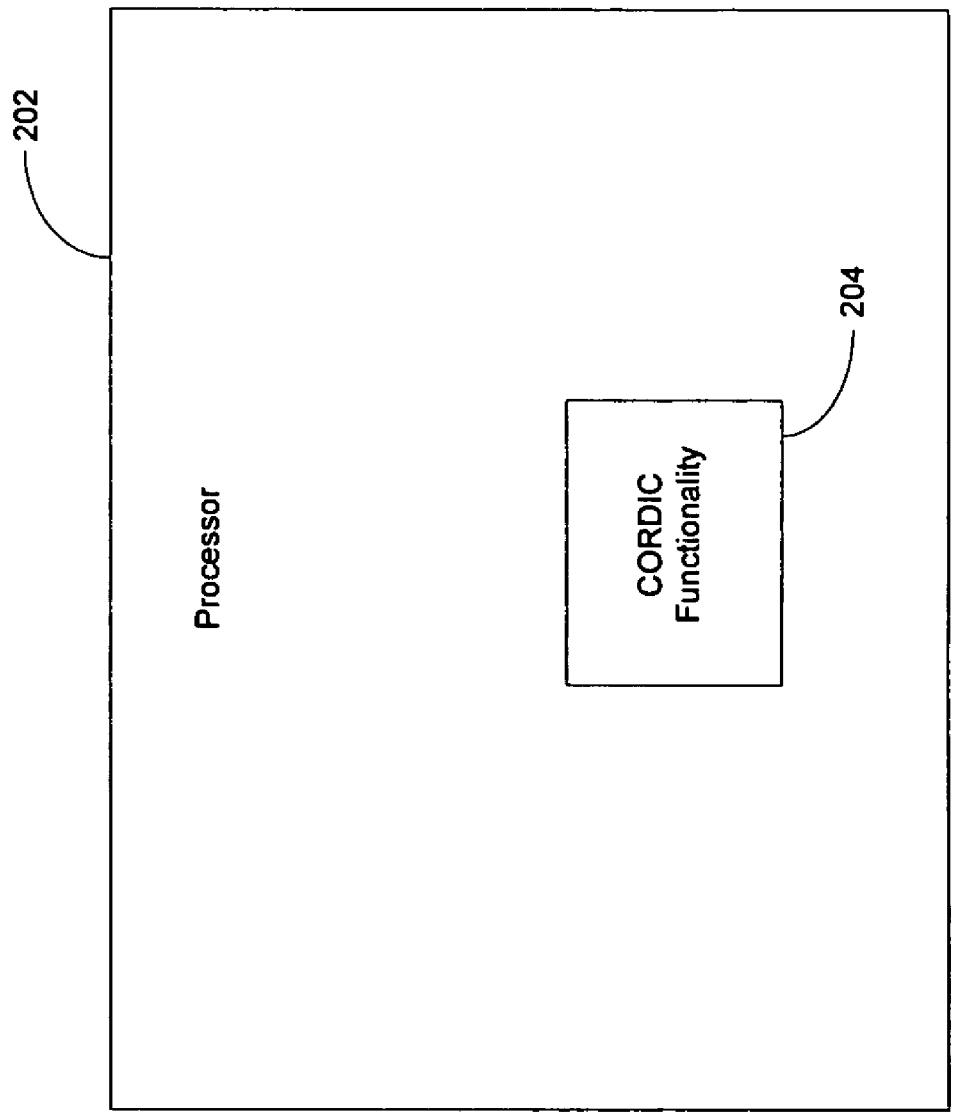
FIG. 2A is a block diagram of an exemplary processor utilizing CORDIC functionality, which may be utilized in connection with an embodiment of the invention.

FIG. 2A is a block diagram of an exemplary processor utilizing CORDIC functionality, which may be utilized in connection with an embodiment of the invention. Referring to FIG. 2A, there is shown a processor 202 and a CORDIC functionality block 204. The processor 202 may be an ARM processor, for example, or other suitable type of processor. The processor 202 may comprise a coordinate rotation digital computer (CORDIC) functionality block 204. The CORDIC functionality block 204 may comprise suitable logic, circuitry and/or code that may be adapted to perform mathematical iterations on an input vector and/or angle value utilizing arctangent look-up tables, for example, during synchronization of data signals, for example.

Figure 2B:
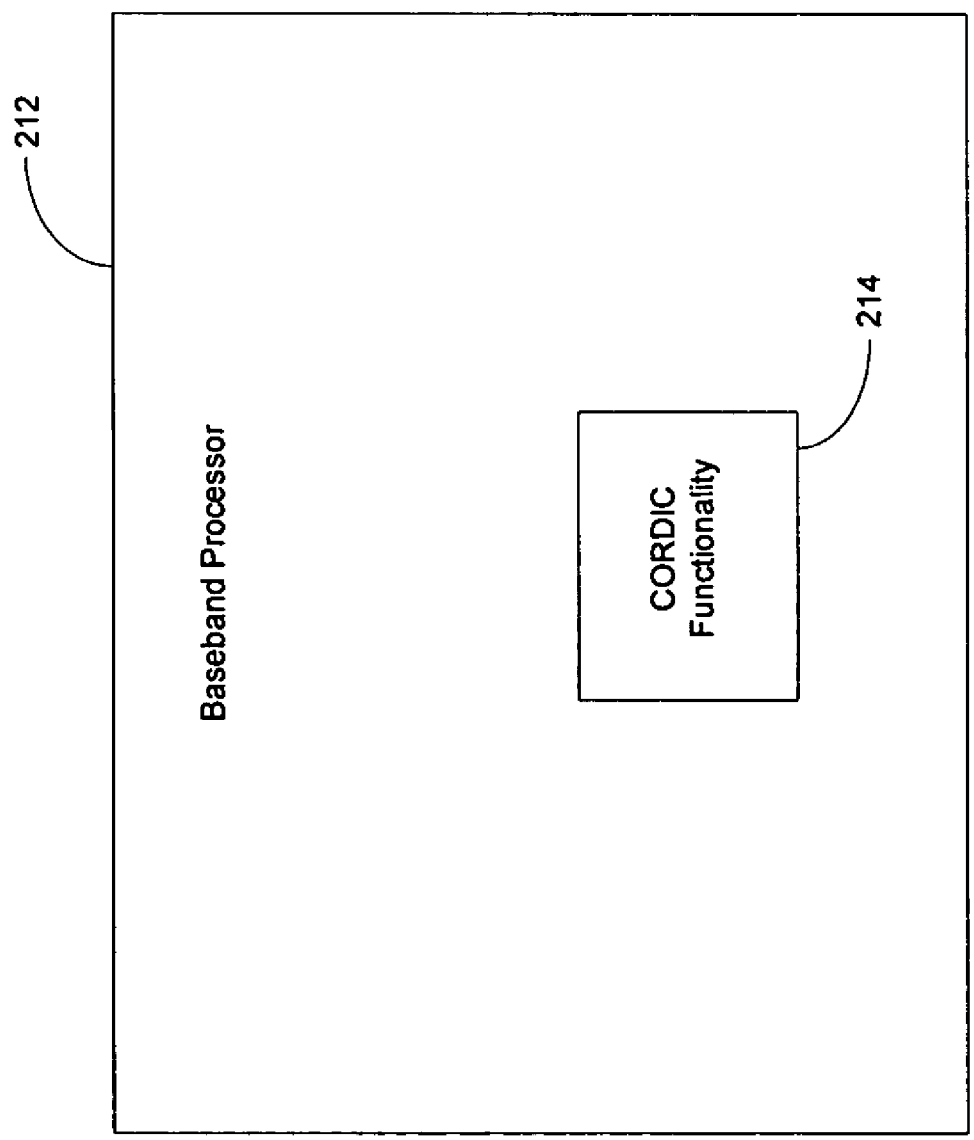
FIG. 2B is a block diagram of an exemplary baseband processor utilizing CORDIC functionality, which may be utilized in connection with an embodiment of the invention.

FIG. 2B is a block diagram of an exemplary baseband processor utilizing CORDIC functionality, which may be utilized in connection with an embodiment of the invention. Referring to FIG. 2B, there is shown a baseband processor 212 and a CORDIC functionality block 214. The baseband processor 212 may provide a digital platform for baseband processing functions, which may comprise analog and digital baseband processing functions, for example. The baseband processor 212 may comprise a coordinate rotation digital computer (CORDIC) functionality block 214. The CORDIC functionality block 214 may comprise suitable logic, circuitry and/or code that may be adapted to perform mathematical iterations on an input vector and/or angle value utilizing arctangent look-up tables, for example, during synchronization of data signals, for example.

Figure 2C:
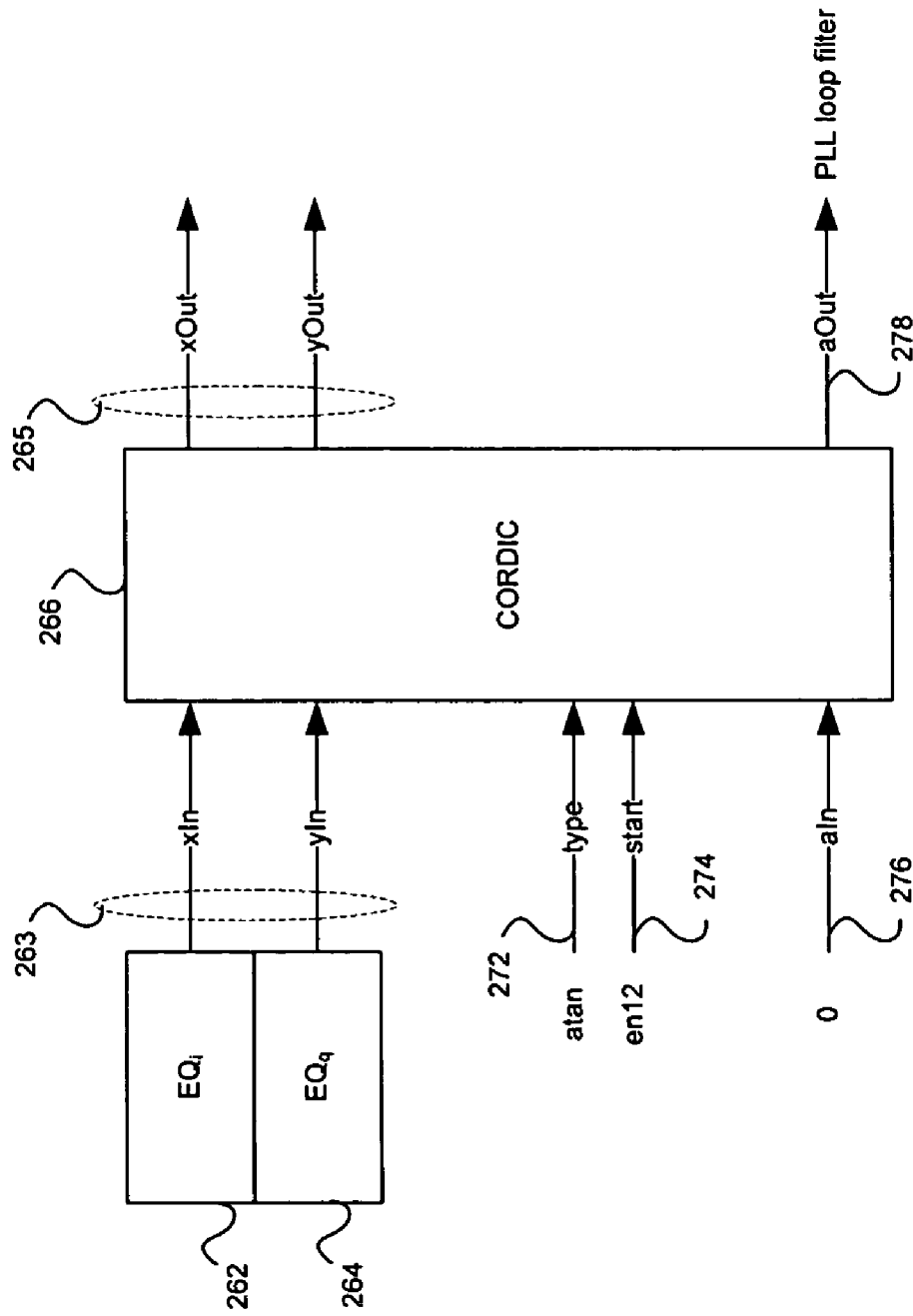
FIG. 2C is a block diagram of an exemplary circuit utilizing CORDIC for determining angle and phase, which may be utilized in connection with an embodiment of the invention.

FIG. 2C is a block diagram of an exemplary circuit utilizing CORDIC for determining angle and phase, which may be utilized in connection with an embodiment of the invention. Referring to FIG. 2C, the exemplary circuit may comprise equalizer circuits 262 and 264 and a CORDIC 266. The equalizer circuits 262 and 264 may comprise suitable logic, circuitry and/or code that may be adapted to equalize an input signal, such as an RF signal, prior to synchronization and/or demodulation and generate a corresponding output vector 263. The generated output vector 263 may comprise an "x" and a "y" component, x In and y In respectively, corresponding to an in-phase (I) and a quadrature (Q) component of the equalizer circuits 262 and 264.

The CORDIC 266 may comprise suitable logic, circuitry and/or code that may be adapted to perform mathematical iterations on an input vector and/or angle value utilizing arctangent look-up tables, for example, during synchronization of one mbps data rate signals, for example. Low rate synchronization may occur prior to PSK synchronization and/or demodulation of two and/or three Mbps data rate signals, for example. The CORDIC 266 may be utilized in an arctangent mode to transform an input vector into amplitude and/or angle. Accordingly, the CORDIC 266 may receive as inputs vector 263, control signals 272 and 274, and an input angle 276. Vector input 263 may be acquired from equalizer circuits 262 and 264. For example, a control signal a tan 272 may initialize the CORDIC 266 to operate in arctangent mode. A control signal en12 274 may be utilized to control an operating frequency set of the CORDIC 266. For example, the CORDIC 266 may be set to operate at 12 operations per microsecond, or one CORDIC 266 operation per 12 MHz clock cycle. The input angle a In 276 may correspond to an angle offset, such as a zero angle offset, for the output vector 265 and the output angle aOut 278 may correspond to the angle of the output vector 265. In addition, the output angle aOut 278 may be biased in a positive or negative direction by setting the input angle a In 276 to a value other than zero. The output angle aOut 278 may be input to a phase locked loop (PLL) loop filter for further processing. The output vector 265 may comprise an "x" and a "y" component, xOut and yOut respectively, where the "x" component may correspond to an amplitude value of the output vector 265, and the "y" component may be zero as the output vector 265 may be located along the x-axis.

At least some of the additional metrics required by the invention may be calculated in hardware and utilized to demodulate the received information. For example, a CORDIC may be utilized to determine rotation and/or angle of in-phase (I) and quadrature (Q) components. By utilizing existing components such as a CORDIC, system performance such as throughput may not be sacrificed to increase the confidence in whether there are corrupt bits in the payload.

Figure 3:
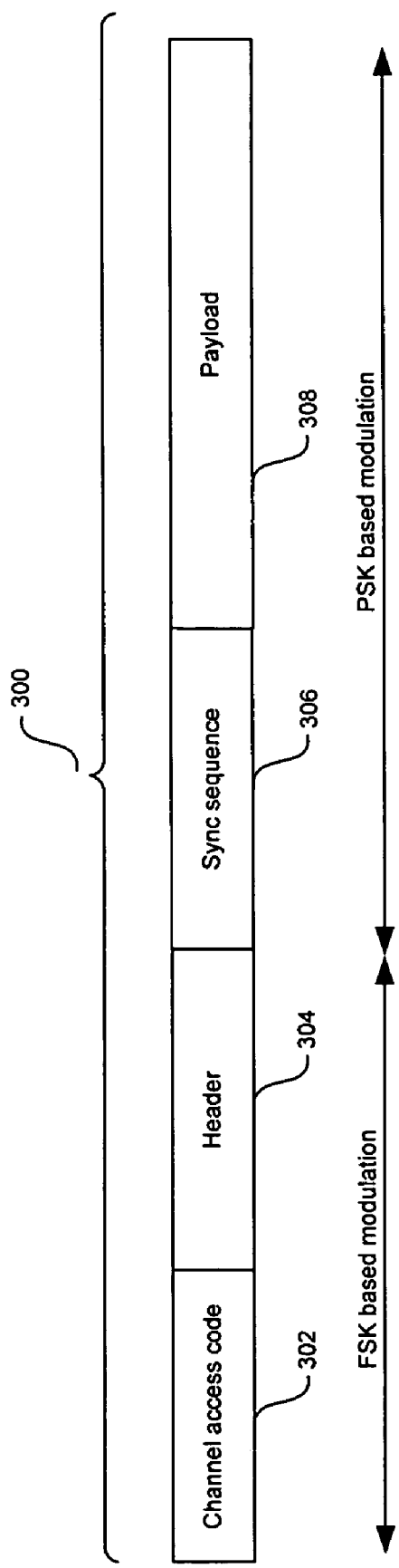
FIG. 3 illustrates an exemplary Bluetooth packet structure in accordance with an embodiment of the invention.

FIG. 3 illustrates an exemplary Bluetooth packet structure in accordance with an embodiment of the invention. Referring to FIG. 3, a general packet structure format for an exemplary Bluetooth packet 300 may comprise a channel access code 302, a header 304, a synchronization (sync) sequence 306, and a payload 308. In this regard, a portion of the Bluetooth packet 300 may also be referred to as a field. The channel access code 302 may comprise a portion of the Bluetooth packet 300 that may be utilized to identify packets on a particular physical channel and/or to exclude or ignore packets on a different physical channel that may be using the same radio frequency (RF) carrier. All packets sent in the same physical channel may have a similar access code, for example. In a receiver device, a sliding correlator may be utilized to correlate at least a portion of the contents of the channel access code 302 and the sliding correlator may trigger to indicate that a channel access code match has occurred when, for example, a threshold level is exceeded.

The header 304 may comprise a portion of the Bluetooth packet 300 that may be utilized for indicating to a receiving device when a particular packet is addressed to that device, the type of packet, a sequential numbering of the packet to order the data packet stream, and/or the manner in which the packet may be routed internally to that device, for example. The header 304 may be utilized in physical channels that support physical links, logical transports, and logical links.

The sync sequence 306 may comprise a portion of the Bluetooth packet 300 that may be utilized to synchronize the contents of the payload 308. This synchronization may be necessary for cases when the payload 308 may be modulated utilizing a different scheme than for other portions of the Bluetooth packet 300. The sync sequence 306 may comprise a plurality of symbols and may have a fixed phase rotation between a first or reference symbol and a last symbol. The payload 308 may comprise a portion of the Bluetooth packet 300 that may be utilized to transport user information.

The channel access code 302 and the header 304 may be modulated utilizing a Frequency Shift Keying modulation (FSK) scheme, for example. This modulation scheme may be utilized to provide backward compatibility between systems that support advanced data rates, for example, 2 megabits per second (Mbps) transmissions or 3 Mbps transmissions, with systems that support slower data rates. In this regard, a slower data rate receiving device may be able to determine from the channel access code 302 and/or the header 304 that the current transmission is intended for a device that supports higher data rates. In an FSK modulation scheme, a plurality of equal-energy orthogonal signal waveforms that may differ in frequency may be generated. The FSK modulation scheme utilized for modulating the channel access code 302 and the header 304 may be a Gaussian FSK (GFSK) modulation scheme, for example, where the signal to be modulated may be filtered utilizing a Gaussian filter.

The sync sequence 306 and the payload 308 may be modulated utilizing a Phase Shift Keying (PSK) modulation scheme, for example. In a PSK modulation scheme, a plurality of equal-energy orthogonal signal waveforms that differ in phase may be generated. The PSK modulation scheme utilized for modulating the sync sequence 306 and the payload 308 may be a Differential PSK (DPSK) modulation scheme, for example, where differentially encoded phase information may be utilized. The DPSK modulation scheme may be an 8-DPSK modulation scheme or a π/4-DPSK modulation scheme, for example. The 8-DPSK may be utilized for 2 megabits per second (Mbps) transmissions and the π/4-DPSK modulation scheme may be utilized for 3 Mbps transmissions.

The FSK based modulation scheme utilized for the channel access code 302 and the header 304 may require a smaller signal-to-noise ratio (SNR) to demodulate than the PSK based modulation scheme utilized for the sync sequence 306 and the payload 308. For example, in some instances, the FSK based modulation scheme may require 14 dB of SNR to achieve a 1e-3 bit error rate (BER) while a PSK based modulation scheme may require 10 dB of SNR to achieve a 1e-4 BER. Since the FSK modulation scheme provides backward compatibility with prior technologies, it may be utilized for modulating the channel access code 302 and the header 304, even when it may result in a higher SNR requirement than for a PSK based modulation. Modulation of the sync sequence 306 and the payload 308 may be performed by utilizing a PSK based modulation scheme to reduce the SNR requirements.

Figure 4A:
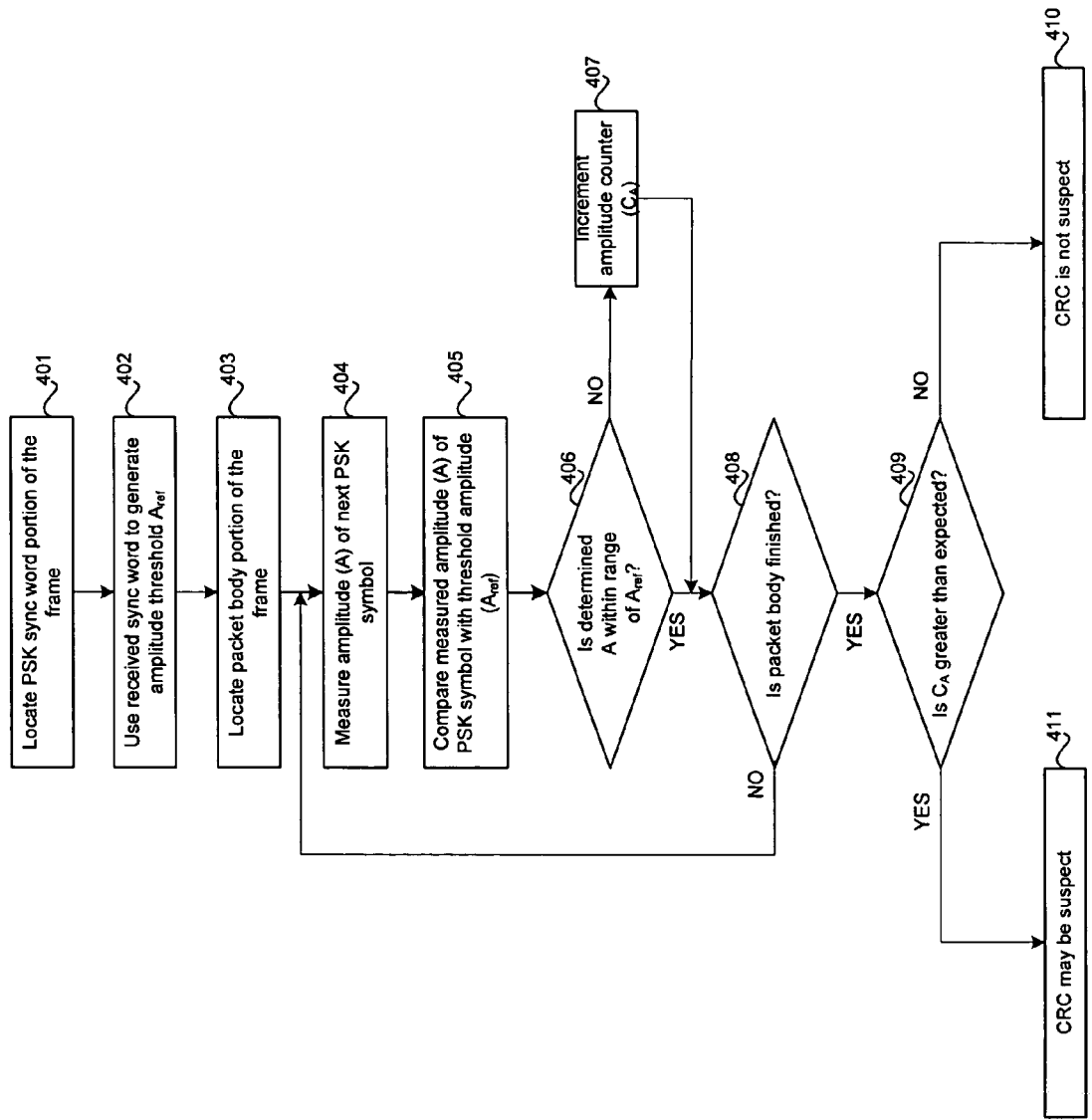
FIG. 4A is a flowchart illustrating exemplary steps that may be utilized to determine whether a CRC has a high confidence level value or is suspect based on amplitude, in accordance with an embodiment of the invention.

FIG. 4A is a flowchart illustrating exemplary steps that may be utilized to determine whether a CRC has a high confidence level value or is suspect based on amplitude, in accordance with an embodiment of the invention. Referring to FIG. 4A, there is shown in step 401, a PSK sync word portion of the frame may be located. In step 402, the received sync word may be utilized to generate an amplitude threshold ($A_{ref}$). In step 403, a packet body portion of the frame may be located. In step 404, the amplitude (A) of the next PSK symbol may be measured. In step 405, the measured amplitude (A) of the PSK symbol may be compared with the threshold amplitude ($A_{ref}$).

In step 406, it may be determined whether the measured amplitude (A) is within a range of the threshold amplitude ($A_{ref}$). Control passes to step 407, if the measured amplitude (A) is not within a range of the threshold amplitude ($A_{ref}$). In step 407, an amplitude counter ($C_A$) may be incremented. Control then passes to step 408. If the measured amplitude (A) is within a range of the threshold amplitude ($A_{ref}$), control passes to step 408. In step 408, it may be determined whether the packet body is finished. If the packet body is not finished, control passes to step 404. If the packet body is finished, control passes to step 409. In step 409, it may be determined whether the value of the amplitude counter ($C_A$) is greater than expected. If the value of the amplitude counter ($C_A$) is greater than expected, control passes to step 411. In step 411, the CRC may be indicated to be suspect. If the value of the amplitude counter ($C_A$) is not greater than expected, control passes to step 410. In step 410, the CRC may be indicated to be not suspect.

Figure 4B:
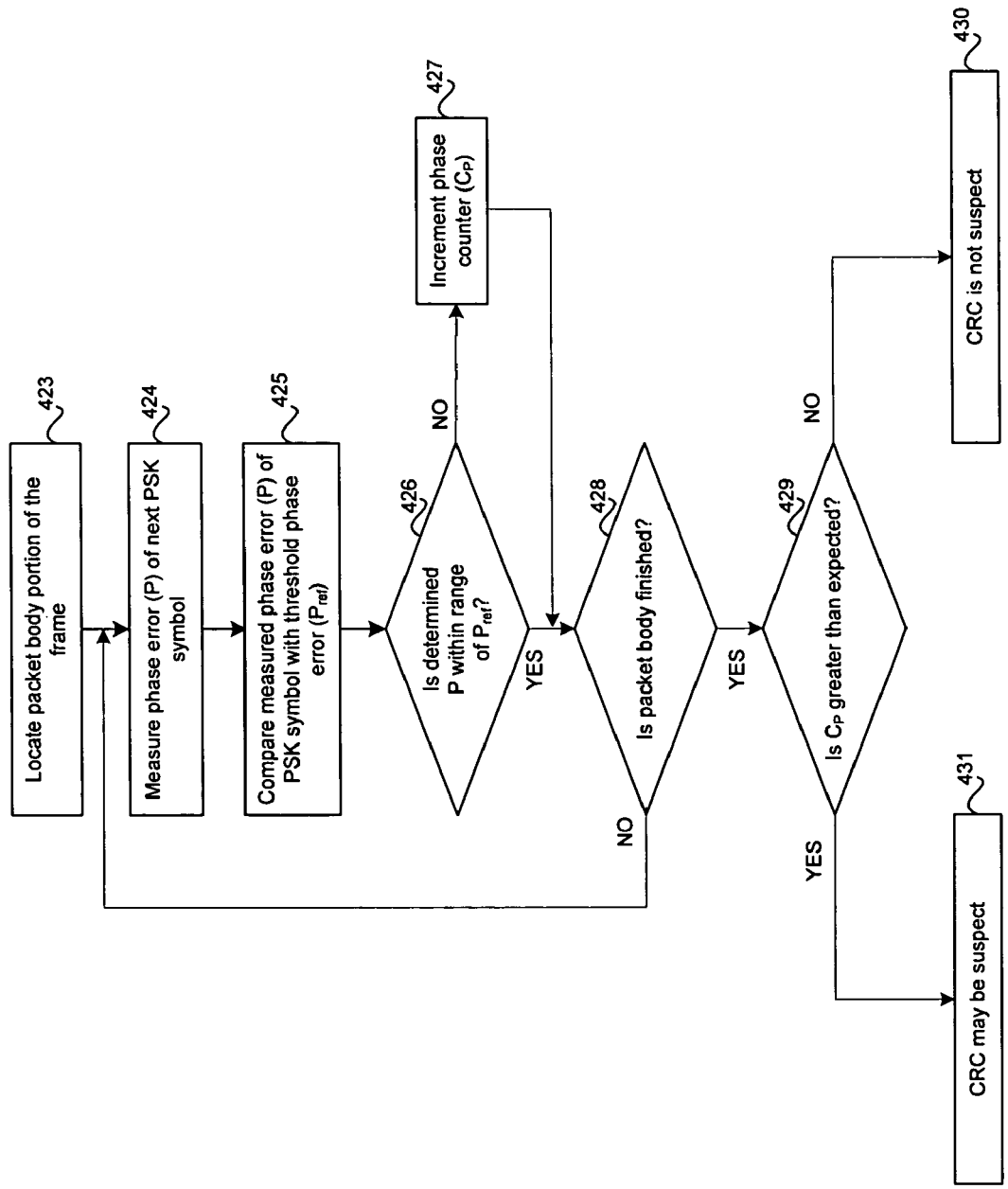
FIG. 4B is a flowchart illustrating exemplary steps that may be utilized to determine whether a CRC has a high confidence level value or is suspect based on phase, in accordance with an embodiment of the invention.

FIG. 4B is a flowchart illustrating exemplary steps that may be utilized to determine whether a CRC has a high confidence level value or is suspect based on phase, in accordance with an embodiment of the invention. Referring to FIG. 4B, there is shown in step 423, a packet body portion of the frame may be located. In step 424, a phase error (P) of the next PSK symbol may be measured. In step 425, the measured phase error (P) of the PSK symbol may be compared with a threshold phase error ($P_{ref}$).

In step 426, it may be determined whether the measured phase error (P) is within a range of the threshold phase error ($P_{ref}$). Control passes to step 427, if the measured phase error (P) is not within a range of the threshold phase error ($P_{ref}$). In step 427, a phase counter ($C_P$) may be incremented. Control then passes to step 428. If the measured phase error (P) is within a range of the threshold phase error ($P_{ref}$), control passes to step 428. In step 428, it may be determined whether the packet body is finished. If the packet body is not finished, control passes to step 424. If the packet body is finished, control passes to step 429. In step 429, it may be determined whether the value of the phase counter ($C_P$) is greater than expected. If the value of the phase counter ($C_P$) is greater than expected, control passes to step 431. In step 431, the CRC may be indicated to be suspect. If the value of the phase counter ($C_P$) is not greater than expected, control passes to step 430. In step 430, the CRC may be indicated to be not suspect.

Figure 4C:
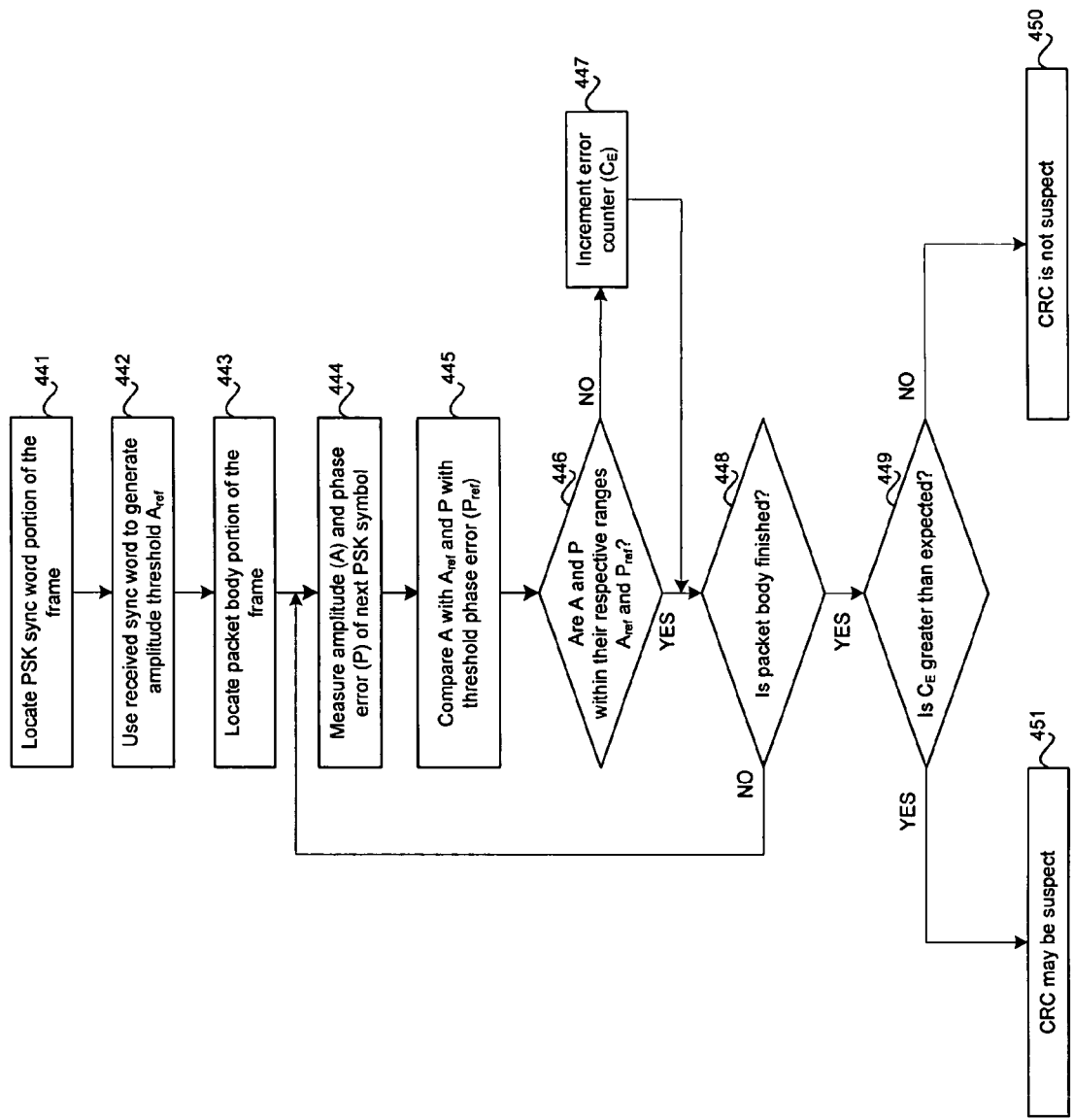
FIG. 4C is a flowchart illustrating exemplary steps that may be utilized to determine whether a CRC has a high confidence level value or is suspect based on amplitude and phase, in accordance with an embodiment of the invention.

FIG. 4C is a flowchart illustrating exemplary steps that may be utilized to determine whether a CRC has a high confidence level value or is suspect based on amplitude and phase, in accordance with an embodiment of the invention. Referring to FIG. 4C, there is shown in step 441, a PSK sync word portion of the frame may be located. In step 442, the received sync word may be utilized to generate an amplitude threshold ($A_{ref}$). In step 443, a packet body portion of the frame may be located. In step 444, the amplitude (A) and phase error (P) of the next PSK symbol may be measured. In step 445, the measured amplitude (A) of the PSK symbol may be compared with the threshold amplitude ($A_{ref}$) and the measured phase error (P) may be compared with the threshold phase error ($P_{ref}$).

In step 446, it may be determined whether the measured amplitude (A) and the measured phase error (P) are within a respective range of the threshold amplitude ($A_{ref}$) and the threshold phase error ($P_{ref}$). Control passes to step 447, if the measured amplitude (A) and the measured phase error (P) is not within a range of the threshold amplitude ($A_{ref}$) and the threshold phase error ($P_{ref}$). In step 447, an error counter ($C_E$) may be incremented. Control then passes to step 448. If the measured amplitude (A) and the measured phase error (P) are within a respective range of the threshold amplitude ($A_{ref}$) and the threshold phase error ($P_{ref}$), control passes to step 448. In step 448, it may be determined whether the packet body is finished. If the packet body is not finished, control passes to step 444. If the packet body is finished, control passes to step 449. In step 449, it may be determined whether the value of the error counter ($C_E$) is greater than expected. If the value of the error counter ($C_E$) is greater than expected, control passes to step 451. In step 451, the CRC may be indicated to be suspect. If the value of the error counter ($C_E$) is not greater than expected, control passes to step 450. In step 450, the CRC may be indicated to be not suspect.

Figure 4D:
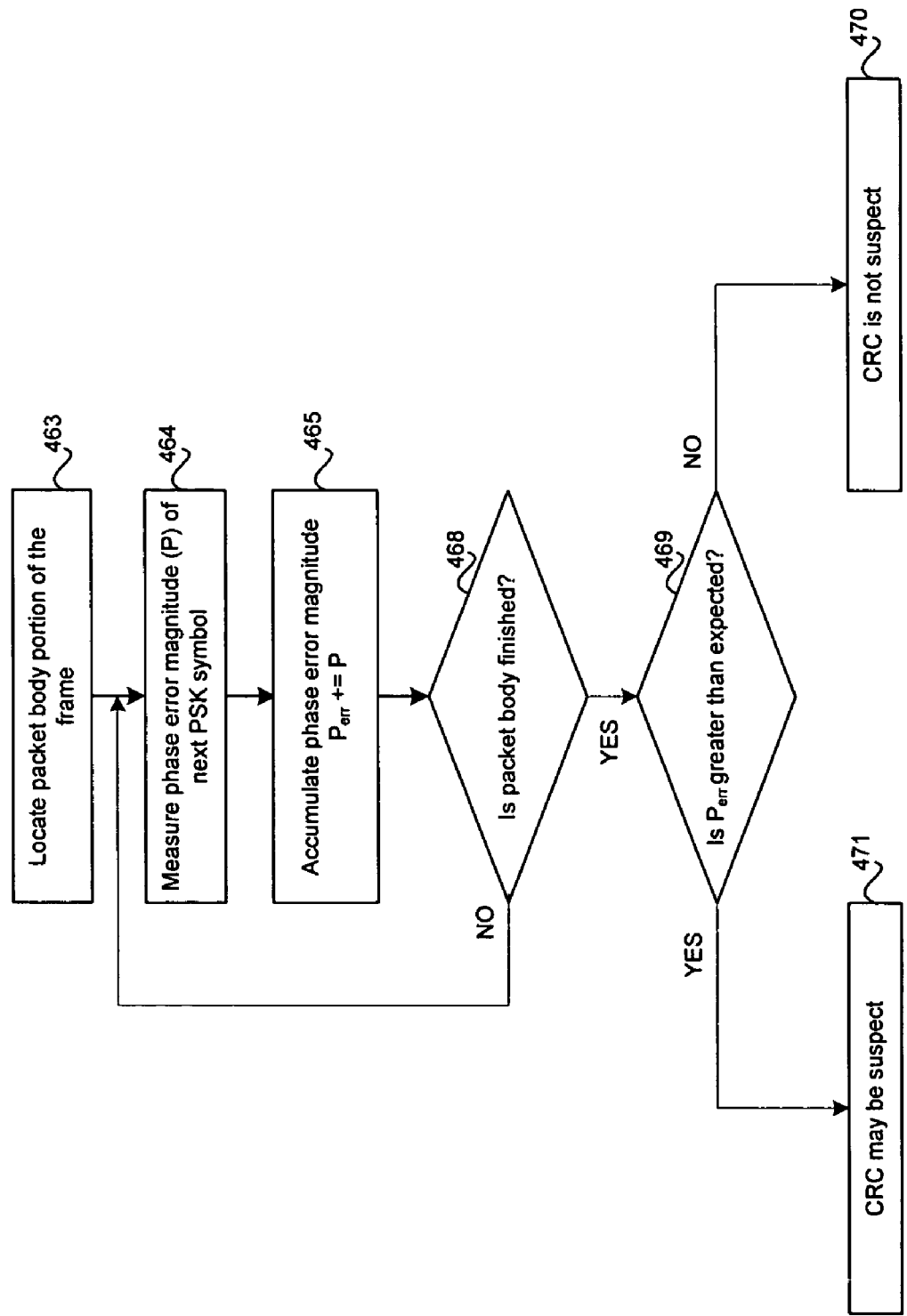
FIG. 4D is a flowchart illustrating alternative exemplary steps that may be utilized to determine whether a CRC has a high confidence level value or is suspect based on amplitude, in accordance with an embodiment of the invention.

FIG. 4D is a flowchart illustrating alternative exemplary steps that may be utilized to determine whether a CRC has a high confidence level value or is suspect based on accumulated phase error, in accordance with an embodiment of the invention. Referring to FIG. 4D, there is shown in step 463, a packet body portion of the frame may be located. In step 464, the size of the phase error (P) of the next PSK symbol may be measured. In step 465, this phase error (P) may be accumulated to determine an accumulated phase error magnitude ($P_{err}$). In step 468, it may be determined whether the packet body is finished. If the packet body is not finished, control passes to step 464. If the packet body is finished, control passes to step 469. In step 429, it may be determined whether the accumulated phase error magnitude ($P_{err}$) is greater than expected. If the accumulated phase error magnitude ($P_{err}$) is greater than expected, control passes to step 471. In step 471, the CRC may be indicated to be suspect. If the accumulated phase error magnitude ($P_{err}$) is not greater than expected, control passes to step 470. In step 470, the CRC may be indicated to be not suspect.

Figure 4E:
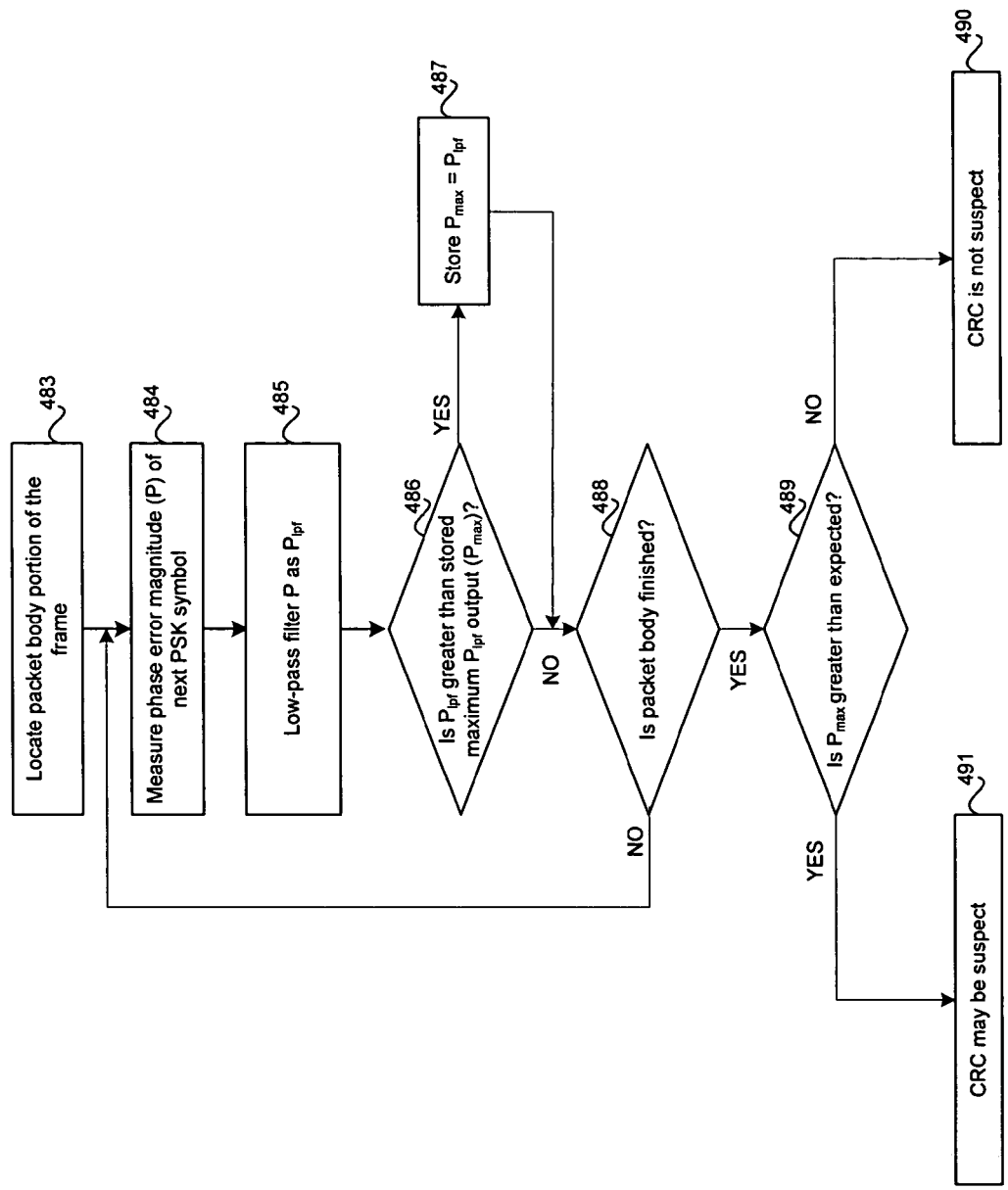
FIG. 4E is a flowchart illustrating alternative exemplary steps that may be utilized to determine whether a CRC has a high confidence level value or is suspect based on phase, in accordance with an embodiment of the invention.

FIG. 4E is a flowchart illustrating alternative exemplary steps that may be utilized to determine whether a CRC has a high confidence level value or is suspect based on phase, in accordance with an embodiment of the invention. FIG. 4E further illustrates an embodiment of the invention in which the phase is processed separately from the amplitude. Referring to FIG. 4E, there is shown in step 483, a packet body portion of the frame may be located. In step 484, a phase error magnitude (P) of the next PSK symbol may be measured. In step 485, the measured phase error (P) may be passed through a low pass filter to generate a filtered phase error magnitude ($P_{lpf}$).

In step 486, it may be determined whether the filtered phase error magnitude ($P_{lpf}$) is greater than a stored maximum value of filtered phase error magnitude ($P_{max}$). Control passes to step 487, if the filtered phase error magnitude ($P_{lpf}$) is greater than a stored maximum value of filtered phase error magnitude ($P_{max}$). In step 487, the maximum value of filtered phase error magnitude ($P_{max}$) is set equal to the filtered phase error magnitude ($P_{lpf}$). Control then passes to step 488. If the filtered phase error magnitude ($P_{lpf}$) is not greater than a stored maximum value of filtered phase error magnitude ($P_{max}$), control passes to step 488. In step 488, it may be determined whether the packet body is finished. If the packet body is not finished, control passes to step 484. If the packet body is finished, control passes to step 489. In step 489, it may be determined whether the maximum value of filtered phase error magnitude ($P_{max}$) is greater than expected. If the maximum value of filtered phase error magnitude ($P_{max}$) is greater than expected, control passes to step 491. In step 491, the CRC may be indicated to be suspect. If the maximum value of filtered phase error magnitude ($P_{max}$) is not greater than expected, control passes to step 490. In step 490, the CRC may be indicated to be not suspect.

Figure 4F:
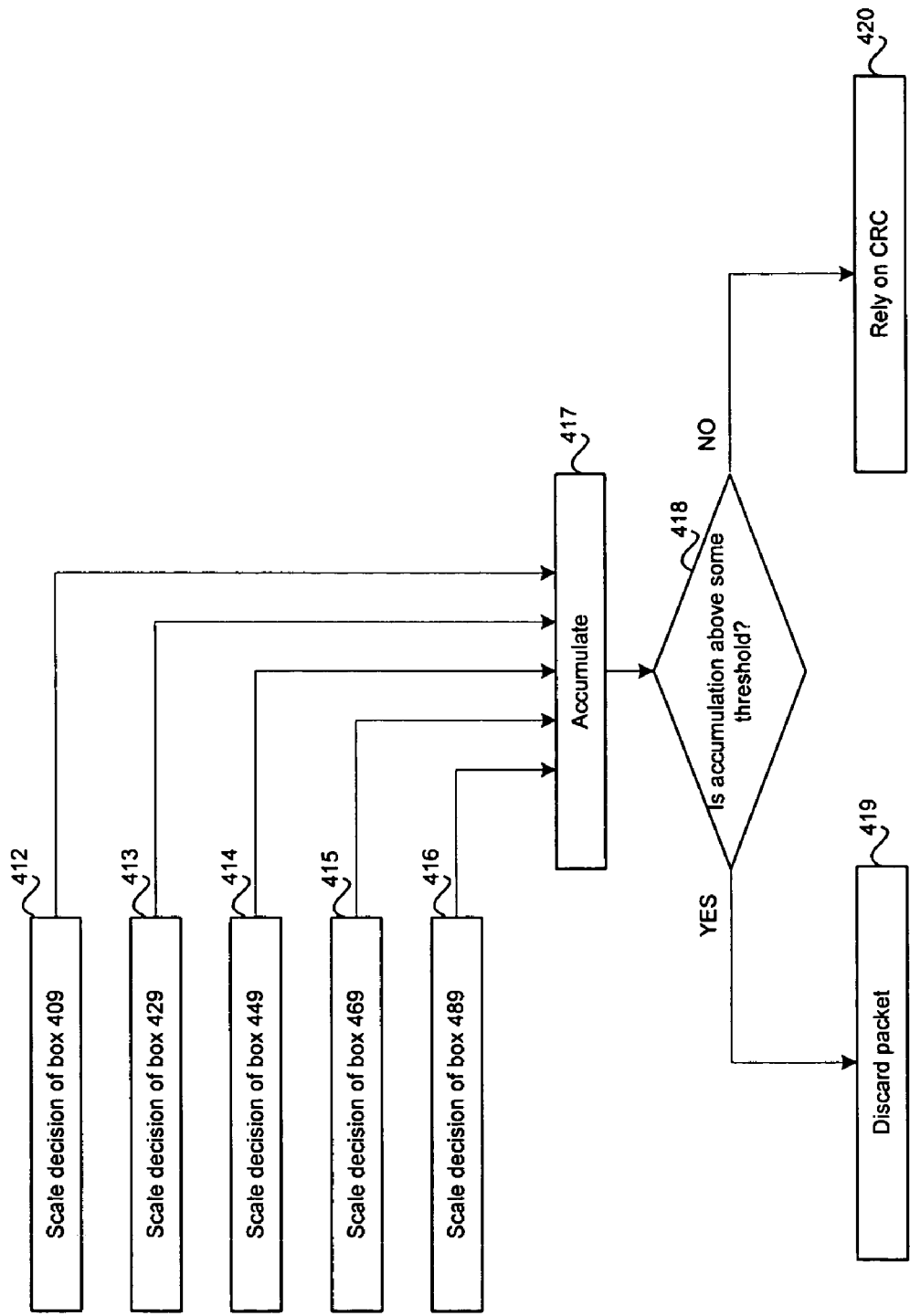
FIG. 4F is a flowchart illustrating accumulation of amplitude and phase errors that may be utilized to determine whether a CRC has a high confidence level value or is suspect based on phase, in accordance with an embodiment of the invention.

FIG. 4F is a flowchart illustrating accumulation of amplitude and phase error metrics that may be utilized to determine whether a CRC has a high confidence level value or is suspect, in accordance with an embodiment of the invention. Referring to FIG. 4F, there is shown in step 412, an output of the decision box in step 409 (FIG. 4A) may be stored. In step 413, an output of the decision box in step 429 (FIG. 4B) may be stored. In step 414, an output of the decision box in step 449 (FIG. 4C) may be stored. In step 415, an output of the decision box in step 469 (FIG. 4D) may be stored. In step 416, an output of the decision box in step 489 (FIG. 4E) may be stored. In step 417, the outputs of blocks 412, 413, 414, 415 and 416 may be accumulated. In step 418, it may be determined whether the accumulated value calculated in step 417 is greater than a threshold. If the accumulated value calculated in step 417 is greater than a threshold, control passes to step 419. In step 419, the packet may be discarded. If the accumulated value calculated in step 417 is not greater than a threshold, control passes to step 420. In step 420, the CRC may be relied upon to determine if a packet is in error.

The amplitude and/or the phase error may be measured by a processor, for example, processor 202 (FIG. 2), which may be programmed to compute the amplitude and phase in a plurality of different ways. For example, the processor 202 may compute a code section that may be adapted to execute a coordinate rotation digital computer (CORDIC) functionality. In another embodiment of the invention, the CORDIC functionality may be implemented in for example, a baseband processor 212. Other embodiments of the invention may utilize various software and/or hardware implementations.

In another embodiment of the invention, a system for handling signal errors may comprise at least one processor 202 that measures an amplitude of at least a portion of a phase shift keyed section of a Bluetooth frame. The at least one processor 202 may be, for example, an ARM processor, or any other suitable type of baseband processor 212 with CORDIC functionality may determine whether the measured amplitude is within a range of a reference amplitude. The at least one processor 202, for example, an ARM processor, or any other suitable type of baseband processor 212 with CORDIC functionality may comprise suitable logic, circuitry and/or code that may be adapted to increment an amplitude counter if the measured amplitude is not within the range of the reference amplitude.

The at least one processor, for example, an ARM processor 202, or any other suitable type of baseband processor 212 with CORDIC functionality may determine a confidence level value of a cyclic redundancy check (CRC) for at least a portion of the phase shift keyed section of the Bluetooth frame based on a determined value of the incremented amplitude counter. The at least one processor, for example, an ARM processor 202, or any other suitable type of baseband processor 212 with CORDIC functionality may be adapted to determine whether at least a portion of the phase shift keyed section of the Bluetooth frame has been located. The at least one processor, for example, an ARM processor 202, or any other suitable type of baseband processor 212 with CORDIC functionality may be adapted to compare the determined measured amplitude with the reference amplitude.

The at least one processor, for example, an ARM processor 202, or any other suitable type of baseband processor 212 with CORDIC functionality may be adapted to indicate the confidence level value of the CRC as HIGH if the determined measured amplitude is within the range of the reference amplitude. The at least one processor, for example, an ARM processor 202, or any other suitable type of baseband processor 212 with CORDIC functionality may be adapted to indicate the confidence level value of the CRC as HIGH if the determined value of the incremented amplitude counter is below at least a first threshold value. The at least one processor, for example, an ARM processor 202, or any other suitable type of baseband processor 212 with CORDIC functionality may be adapted to indicate the confidence level value of the CRC as LOW if the determined value of the incremented amplitude counter is above at least a second threshold value. The at least one processor, for example, an ARM processor 202, or any other suitable type of baseband processor 212 with CORDIC functionality may be adapted to measure a phase of at least a portion of the phase shift keyed section of the Bluetooth frame. The at least one processor, for example, an ARM processor 202, or any other suitable type of baseband processor 212 with CORDIC functionality may be adapted to determine whether the measured phase is within a range of a reference phase.

The at least one processor, for example, an ARM processor 202, or any other suitable type of baseband processor 212 with CORDIC functionality may be adapted to increment a phase counter if the determined measured phase is not within the range of the reference phase. The at least one processor, for example, an ARM processor 202, or any other suitable type of baseband processor 212 with CORDIC functionality may be adapted to determine a confidence level value of the CRC for at least a portion of the phase shift keyed section of the Bluetooth frame based on a determined value of the incremented phase counter. The at least one processor, for example, an ARM processor 202, or any other suitable type of baseband processor 212 with CORDIC functionality may be adapted to compare the determined measured phase with the reference phase. The at least one processor, for example, an ARM processor 202, or any other suitable type of baseband processor 212 with CORDIC functionality may be adapted to indicate the confidence level value of the CRC as HIGH if the determined measured phase is within the range of the reference phase.

The at least one processor, for example, an ARM processor 202, or any other suitable type of baseband processor 212 with CORDIC functionality may be adapted to indicate the confidence level value of the CRC as HIGH if the determined value of the incremented phase counter is below at least a third threshold value. The at least one processor, for example, an ARM processor 202, or any other suitable type of baseband processor 212 with CORDIC functionality may be adapted to indicate the confidence level value of the CRC as LOW if the determined value of the incremented phase counter is above at least a fourth threshold value.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for handling signal errors, the method comprising:
    measuring an amplitude of at least a portion of a phase shift keyed section of a Bluetooth frame;
    determining whether said measured amplitude is within a range of a reference amplitude;
    incrementing an amplitude counter based on said determining; and
    determining a confidence level value of a cyclic redundancy check (CRC) for at least said portion of said phase shift keyed section of said Bluetooth frame based on a determined value of said incremented amplitude counter.

2. The method according to claim 1, further comprising determining whether at least said portion of said phase shift keyed section of said Bluetooth frame has been located.

3. The method according to claim 1, further comprising comparing said determined measured amplitude with said reference amplitude.

4. The method according to claim 1, further comprising indicating said confidence level value of said CRC as HIGH if said determined measured amplitude is within said range of said reference amplitude.

5. The method according to claim 1, further comprising incrementing said amplitude counter if said determined measured amplitude is not within said range of said reference amplitude.

6. The method according to claim 1, further comprising indicating said confidence level value of said CRC as HIGH if said determined value of said incremented amplitude counter is below at least a first specified value.

7. The method according to claim 1, further comprising indicating said confidence level value of said CRC as LOW if said determined value of said incremented amplitude counter is above at least a second specified value.

8. The method according to claim 1, further comprising measuring a phase of at least said portion of said phase shift keyed section of said Bluetooth frame.

9. The method according to claim 8, further comprising determining whether said measured phase is within a range of a reference phase.

10. The method according to claim 9, further comprising incrementing a phase counter if said determined measured phase is not within said range of said reference phase.

11. The method according to claim 10, further comprising determining a confidence level value of said CRC for at least said portion of said phase shift keyed section of said Bluetooth frame based on a determined value of said incremented phase counter.

12. The method according to claim 11, further comprising comparing said determined measured phase with said reference phase.

13. The method according to claim 12, further comprising indicating said confidence level value of said CRC as HIGH if said determined measured phase is within said range of said reference phase.

14. The method according to claim 13, further comprising indicating said confidence level value of said CRC as HIGH if said determined value of said incremented phase counter is below at least a third specified value.

15. The method according to claim 14, further comprising indicating said confidence level value of said CRC as LOW if said determined value of said incremented phase counter is above at least a fourth specified value.

16. A machine-readable storage having stored thereon, a computer program having at least one code section for handling signal errors, the at least one code section being executable by a machine for causing the machine to perform steps comprising:
    measuring an amplitude of at least a portion of a phase shift keyed section of a Bluetooth frame;
    determining whether said measured amplitude is within a range of a reference amplitude;
    incrementing an amplitude counter based on said determining; and
    determining a confidence level value of a cyclic redundancy check (CRC) for at least said portion of said phase shift keyed section of said Bluetooth frame based on a determined value of said incremented amplitude counter.

17. The machine-readable storage according to claim 16, further comprising code for determining whether at least said portion of said phase shift keyed section of said Bluetooth frame has been located.

18. The machine-readable storage according to claim 16, further comprising code for comparing said determined measured amplitude with said reference amplitude.

19. The machine-readable storage according to claim 16, further comprising code for indicating said confidence level value of said CRC as HIGH if said determined measured amplitude is within said range of said reference amplitude.

20. The machine-readable storage according to claim 16, further comprising code for incrementing said amplitude counter if said determined measured amplitude is not within said range of said reference amplitude.

21. The machine-readable storage according to claim 16, further comprising code for indicating said confidence level value of said CRC as HIGH if said determined value of said incremented amplitude counter is below at least a first specified value.

22. The machine-readable storage according to claim 16, further comprising code for indicating said confidence level value of said CRC as LOW if said determined value of said incremented amplitude counter is above at least a second specified value.

23. The machine-readable storage according to claim 16, further comprising code for measuring a phase of at least said portion of said phase shift keyed section of said Bluetooth frame.

24. The machine-readable storage according to claim 23, further comprising code for determining whether said measured phase is within a range of a reference phase.

25. The machine-readable storage according to claim 24, further comprising code for incrementing a phase counter if said determined measured phase is not within said range of said reference phase.

26. The machine-readable storage according to claim 25, further comprising code for determining a confidence level value of said CRC for at least said portion of said phase shift keyed section of said Bluetooth frame based on a determined value of said incremented phase counter.

27. The machine-readable storage according to claim 26, further comprising code for comparing said determined measured phase with said reference phase.

28. The machine-readable storage according to claim 27, further comprising code for indicating said confidence level value of said CRC as HIGH if said determined measured phase is within said range of said reference phase.

29. The machine-readable storage according to claim 28, further comprising code for indicating said confidence level value of said CRC as HIGH if said determined value of said incremented phase counter is below at least a third specified value.

30. The machine-readable storage according to claim 29, further comprising code for indicating said confidence level value of said CRC as LOW if said determined value of said incremented phase counter is above at least a fourth specified value.

* * * * *